(12) United States Patent
Cameron

(10) Patent No.: US 7,718,149 B2
(45) Date of Patent: May 18, 2010

(54) CUPOLA FLUE GAS TREATMENT

(75) Inventor: Donald A. Cameron, Birmingham, AL (US)

(73) Assignee: NCH Corporation, Irving, TX (US)

( * ) Notice: Subject to any disclaimer, the term of this patent is extended or adjusted under 35 U.S.C. 154(b) by 0 days.

(21) Appl. No.: 12/171,635

(22) Filed: Jul. 11, 2008

(65) Prior Publication Data

US 2009/0155155 A1 Jun. 18, 2009

Related U.S. Application Data

(60) Provisional application No. 61/013,766, filed on Dec. 14, 2007.

(51) Int. Cl.
*B01D 53/34* (2006.01)
*B01D 53/48* (2006.01)
*C09K 3/00* (2006.01)
*C09K 3/16* (2006.01)

(52) U.S. Cl. .................. 423/210; 423/242.1; 423/242.7; 252/182.11; 252/189; 252/390

(58) Field of Classification Search ............. 423/242.1, 423/242.7, 210; 252/182.11, 189, 390
See application file for complete search history.

(56) References Cited

U.S. PATENT DOCUMENTS

| | | | |
|---|---|---|---|
| 2,745,809 A | 5/1956 | Cardwell et al. | |
| 3,687,859 A * | 8/1972 | Silverstein | ........... 252/180 |
| 4,026,946 A | 5/1977 | Quinlan | |
| 4,120,654 A | 10/1978 | Quinlan et al. | |
| 4,439,351 A * | 3/1984 | Sinha | ........... 252/500 |
| 4,719,036 A | 1/1988 | Clubley et al. | |
| 5,366,643 A | 11/1994 | Walker | |
| 5,411,670 A | 5/1995 | Walker | |
| 5,916,483 A | 6/1999 | Burge et al. | |
| 6,861,032 B2 | 3/2005 | Shimura et al. | |
| 6,929,032 B2 | 8/2005 | Rehder et al. | |
| 6,986,358 B2 | 1/2006 | Mattox et al. | |
| 7,216,710 B2 | 5/2007 | Welton et al. | |
| 7,370,674 B2 | 5/2008 | Doyle | |
| 2003/0199397 A1 | 10/2003 | Zaid et al. | |
| 2005/0250666 A1 | 11/2005 | Gatlin et al. | |
| 2005/0263739 A1 | 12/2005 | Mattox et al. | |
| 2006/0283514 A1 | 12/2006 | Rehder et al. | |
| 2007/0001150 A1 | 1/2007 | Hudgens et al. | |

* cited by examiner

*Primary Examiner*—Timothy C Vanoy
(74) *Attorney, Agent, or Firm*—Locke Lord Bissell & Liddell, LLP

(57) ABSTRACT

An additive and method of use for treating flue gas of a coke-fired cupola following removal of the blast air during shutdown to adjust the charge and reduce acid buildup in the condensate and corrosion in downstream equipment by injecting into the flue gas a finely divided spray comprising an additive containing a volatile amine mixed with an antistatic agent that creates a positive static charge in the additive, and elevates the pH of the condensate by reducing the formation of sulfuric acid from entrained sulfur-containing compounds.

31 Claims, 1 Drawing Sheet

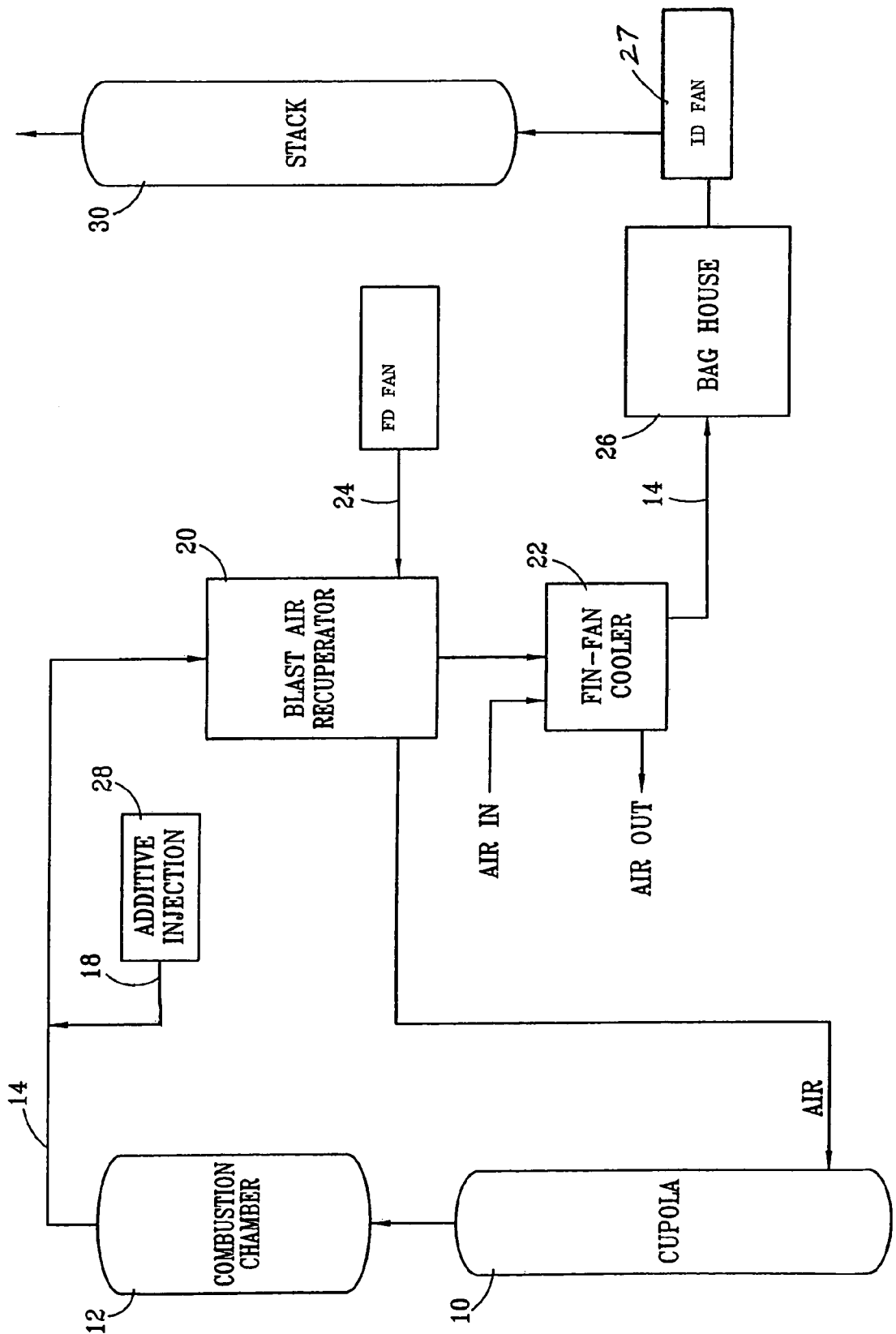

CUPOLA FLUE GAS TREATMENT

CROSS-REFERENCE TO RELATED APPLICATION(S)

This application is based upon and claims priority from U.S. Provisional Application No. 61/013,766, filed Dec. 14, 2007.

BACKGROUND OF THE INVENTION

1. Field of the Invention

This invention relates to the treatment and neutralization of corrosive compounds and acid buildup in the flue gas and flue gas condensate of coke-fired industrial heating devices during shutdown, and more particularly, in the flue gas ductwork, piping, and downstream heat exchangers of a coke-fired foundry cupola of the type used in making pig iron or ductile iron from scrap iron.

2. Description of Related Art

Coke is used as the primary heating source for the melting of scrap iron in a foundry cupola. Because of the sulfur content in coke, sulfurous compounds are formed during combustion and exit the cupola in the flue gas. Water vapor created as a byproduct of combustion is also present. As long as the flue gas temperature stays above the dew point of water, the water will not react with sulfur dust entrained in the flue gas. However, many such cupolas are not run continuously, and during the shutdown phase of cupola operation, after the blast air is removed from the tuyeres, a fine water mist is sprayed into the flue gas stream to provide additional cooling. When the flue gas falls below 300° F., all wind to the unit is stopped. At that time, the cap to the combustion chamber is opened to the atmosphere. This action is done to prevent carbon monoxide and other objectionable fumes from building up in the plant. As the heat and fumes escape to the atmosphere, a venturi effect causes the air stream downstream of the combustion chamber to reverse. Air starts to flow in the opposite direction as opposed to the normal operational air flow. Moisture-laden atmospheric air is drawn into the system from the bag house. As the flue gas duct work cools, the dew point is reached. The resultant condensate combines with the entrained sulfurous compounds to produce sulfuric acid, which is highly corrosive to ductwork, piping and downstream heat exchange equipment. The associated repair and replacement costs for corroded downstream equipment have made it highly desirable to reduce such corrosion.

The use of morpholine or morpholine derivatives, sometimes in combination with amine alcohols, in steam lines and, more generally, as an acid neutralizer and or pH buffer in other applications including, for example, pipelines and processing equipment for petroleum fluids, is known. Prior patents and some published pending patent applications disclosing the use of such compounds, often in combination with other compositional components, are disclosed below: U.S. Pat. Nos. 7,216,710; 6,986,358; 6,861,032; 5,916,483; 5,411,670; 5,366,643; 4,719,036; 4,120,654; 4,026,946; and 2,745,809. United States Publication Nos. 20070001150; 20050263739; 20050250666;and 20030199397. Some of the references disclose compositions useful as corrosion inhibitors that contain various amines and also contain quaternary ammonium chloride, often in combination with other compounds.

SUMMARY OF THE INVENTION

According to one preferred embodiment of the invention, a method is disclosed for treating the flue gas of a coke-fired industrial device following cessation or removal of the blast air during shutdown that comprises injecting into the flue gas an atomized spray comprising a volatile amine mixed with an antistatic agent that is believed to alter the electrostatic charge of the flue gas and neutralize any sulfuric acid formed by the presence of sulfur-containing components in the flue gas.

According to another embodiment of the invention, as a coke-fired cupola is shutting down, meaning that the flow of blast air is terminated, a mixture of at least one antistatic agent and a volatile amine, such as morpholine, is injected into the combustion chamber of the cupola, which injection continues until the temperature of the flue gas is below 291° F., the flash point of the mixture. Because the amine is volatilized as it is injected into the flue gas stream at temperatures above 291° F., and because the antistatic agent is believed to give the mixture a positive static charge, the alkaline amine is attracted to the negatively charged gas particles in the flue gas. This enables the alkaline amine to react with the sulfur-containing dust particles that are entrained in the flue gas or attached to the duct work through which the overhead gas stream passes, and neutralizes any acid formed by the condensation of water vapor around the dust particles.

According to another embodiment of the invention, a method is disclosed whereby a mixture of finely divided droplets of a preferred additive are injected into a flue gas stream during the cool-down operational phase of a coke-fired industrial device, the preferred additive desirably comprising a blended amine and an antistatic agent. According to one preferred embodiment of the invention, the blended amine comprises amines selected from the group consisting of morpholine, cyclohexylamine and diethylaminoethanol. According to another preferred embodiment of the invention, the antistatic agent is quaternary ammonium chloride. According to another preferred embodiment of the invention, the blended amine and the antistatic agent are desirably mixed at a ratio of about 25 to 1 by volume.

According to another embodiment of the invention, a method is disclosed for increasing the pH of the flue gas dust deposition of a coke-fired foundry cupola during shutdown from less than about 5.8 to between about 7.0 and 7.5 by treating the flue gas with a mixture of a volatile amine and an antistatic agent. Preferred volatile amines for use in the invention are selected from the group consisting of morpholine, and a blended amine comprising morpholine and at least one of cyclohexylamine and diethylaminoethanol. According to another embodiment of the invention, the flue gas is treated with a finely divided spray containing a mixture of volatile amine and antistatic agent. According to another preferred embodiment of the invention, the antistatic agent is a quaternary ammonium compound such as quaternary ammonium chloride.

According to another embodiment of the invention, an additive useful for treating flue gas of a coke-fired industrial device during shutdown is disclosed, the additive comprising an amine and an antistatic agent in an amount that is sufficient to neutralize the pH of a condensate obtained by spraying into the flue gas a finely divided mist containing the additive. According to a preferred embodiment of the invention, the additive comprises a blended amine selected from the group consisting of a mixture of morpholine with at least one of the group consisting of cyclohexylamine, diethylaminoethanol, and mixtures thereof. According to another preferred embodiment of the invention, the antistatic agent used in the additive is a quaternary ammonium compound such as quaternary ammonium chloride. According to another preferred embodiment of the invention, the additive comprises a ratio of about 25 parts volatile amine to about 1 part antistatic agent by volume. The use of a blended amine as the volatile amine component is preferred for use in piping runs that are longer than about 25 yards in length.

BRIEF DESCRIPTION OF THE DRAWING

The apparatus of the invention is further described and explained in relation to the accompanying drawing that is a simplified process flow diagram for implementing a preferred embodiment of the method of the invention.

DESCRIPTION OF THE PREFERRED EMBODIMENTS

Referring to the accompanying drawing, hot gas from cupola 10 enters combustion chamber 12, which is normally adjacent to cupola 10, where secondary combustion occurs from the melting process. Additive spray 18 is introduced to temper the hot flue gas 14 from an operating temperature range of about 1380 to about 1475° F. down to a temperature of about 930 to about 1020° F. to prior to entering a blast air recuperator 20. A thermal gradient in recuperator 20 allows incoming blast air 24 that is at or near ambient temperature to extract heat from the hotter flue gas stream 14. From recuperator 20, the flue gas and any associated flue gas condensate enter fin-fan cooler 22 to further reduce the flue gas temperature before it enters bag house 26. Fin-fan cooler 22 contains fins that serve as an additional heat sink to extract additional heat from flue gas stream 14. Fin-fan cooler 22 preferably comprises an induced draft fan that draws ambient air past the fins. In bag house 26, any remaining particulate dust is removed from the stream prior to discharging the gas into the atmosphere through stack 30.

If a foundry cupola is operated continuously and never shuts down, the associated flue gas handling equipment such as recuperator 20, fin-fan cooler 22 and bag house 26 are never cooled sufficiently to form condensate, and the formation of acid in the condensate due to sulfur-containing particles in the flue gas does not occur. However, most foundry cupola operations are not operated continuously, and go through periodic, sometimes daily or weekly, shutdowns. It is primarily during the cool-down period associated with such shutdowns that use of the invention disclosed herein is needed. During the cool-down period, condensate collects inside the duct work and on the cooled metal surfaces such as, for example, the housing of induced draft ("ID") fan 27, recuperator 20 and the base of exhaust stack 30.

Although the invention is primarily disclosed herein in relation to a preferred embodiment of a foundry cupola, it will be appreciated that similar needs can occur in any circumstance where sulfur-containing coke is being used to fire vessels, and where the flue gas is subsequently condensed, thereby producing potentially corrosive flue gas. The present invention is particularly useful where downstream heat exchangers are used to recover thermal energy from the flue gas and condensate, because of the potentially expensive repair and replacement costs where corrosion occurs. It will also be appreciated upon reading this disclosure that other types of heat exchange equipment can likewise be used downstream of combustion chamber 12 in conjunction with the method and additive of the invention.

To implement the invention, spray 18 is desirably atomized into fine droplets when it is injected into flue gas stream 14 to facilitate dispersion of the additive throughout the flue gas. Additive spray 18 is preferably injected into the duct work just downstream of combustion chamber 12 and upstream of blast air recuperator 20, as close as possible to the combustion chamber, and, if accessible, in the combustion chamber as the gas exits the chamber The injection equipment desirably comprises a high pressure pump, atomizing spray nozzles, pneumatic air supply, and electrical controller. The system is connected to the programmable controller of cupola 10, allowing the operator to turn on the equipment at the appropriate time in the shutdown process. Once the injection unit is started, the injection pump will activate to pump the additive into the combustion chamber or flue gas discharge line 14. At substantially the same time, an air valve will open, further pressurizing discharge line 14 to insure total atomization at the spray nozzles. Once the injection unit has timed out, the chemical pump will shut off with the air valve continuing to operate for a while on a time-delay switch. The purpose of the time delay on the pneumatic air supply is to allow time for the air to clear all the additive from line 14, thereby preventing the additive from boiling out in the line once normal cupola operation is restarted.

The additive preferably comprises an amine component that is volatile at the flue gas temperatures and a liquid antistatic agent. The volatile amine component preferably further comprises either morpholine or a blended amine comprising a mixture of morpholine, cyclohexylamine and diethylaminoethanol, or mixtures thereof. The use of morpholine alone is believed to be satisfactory for use in applications where the piping run for the flue gas is up to about 25 yards. The use of a blended amine comprising morpholine, cyclohexylamine and diethylaminoethanol is preferred for use in installations where the piping runs are longer than about 25 yards. Blended amines are desirable for use in the additive of the invention in installations having long or complex piping runs because of their differing distribution ratios and the tendency of different amines to drop out of the system at different times.

The antistatic agent preferred for use in the invention is quaternary ammonium chloride, although it will be appreciated by those of skill in the art upon reading this disclosure that other antitstatic agents can be used provided that they perform similarly well for the purpose of producing a positive charge in the finely divided droplets of the spray. Because the sulfur-containing components of the flue gas are typically negatively charged, the presence of the antistatic agent is believed to alter the static charge in the droplets, creating a positive static charge and thereby assisting in promoting contact between the sulfur-containing components and the acid-neutralizing amine component of the additive that is also carried in the spray.

For a foundry cupola having a flue gas discharge rate of about 25,000 cfm, the additive application rate is preferably about 5.2 gallons of additive containing about a 25 to 1 blend (by volume) of the amine to the antistatic agent in about 1.5 hours. It will be appreciated, however, that the application rate can vary depending upon the size and configuration of the coke-fired device, the sulfur content of the coke, the flue gas flow rate, the flue gas discharge temperature, and the particular amine/antistat combination.

EXAMPLE

To evaluate the change in the electrostatic charge of flue gas stream 14 of a foundry cupola during the cool-down phase of a shutdown sequence that is achieved by injecting a spray containing the preferred additive of the invention as disclosed above, a static gun was used to determine the electrostatic charge of the flue gas discharged from ID fan 27. Prior to injecting the additive of the invention into gas stream 14, the mean average of the electrostatic charge in the outlet air from ID fan 27 was negative 3000 volts. Then an additive comprising 25 parts by volume of morpholine and 1 part by volume quaternary ammonium chloride was introduced into flue gas stream 14 at a treatment rate of 0.06 gallons per minute additive, and after forty-five minutes, the electrostatic charge of flue gas stream 14 was a positive 2000 volts. In this installation, the pipe run was less than 25 yards from the point of injection to recuperator 20.

To evaluate the pH change of dust particles recovered from the dust collection probes downstream of recuperator 20 prior to treatment of flue gas stream 14 with the additive of the invention, 2 grams of dust particles were mixed with 25 ml of deionized water and the mean average pH of the solution was determined to be 5.8. Following introduction of the additive as disclosed above into flue gas stream 14, 2 grams of dust particles recovered from the collection probes disposed downstream of recuperator 20 were mixed with 25 ml of deionized water, and the mean average pH of the solution was determined to be 7.4.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventor is legally entitled.

I claim:

1. A method for treating flue gas of a coke-fired heating device during shutdown of the device, wherein the flue gas comprises dust containing negatively charged sulfur-containing compounds and having an initial pH, by injecting into the flue gas an atomized spray comprising a volatile amine mixed with an antistatic agent that creates a positive charge in the spray, whereby the positive charge attracts the negatively charged sulfur-containing compounds in the flue gas dust, and whereby the volatile amine elevates the initial pH of the flue gas dust to a less corrosive level.

2. The method of claim 1 wherein the heating device is a foundry cupola.

3. The method of claim 1 wherein the volatile amine comprises morpholine.

4. The method of claim 1 wherein the volatile amine is selected from the group consisting of morpholine, cyclohexylamine, diethylaminoethanol, and mixtures thereof.

5. The method of claim 1 wherein the volatile amine elevates the pH of the flue gas dust to at least about 7.0.

6. The method of claim 1 wherein the antistatic agent is quaternary ammonium chloride.

7. The method of claim 1 wherein the ratio of volatile amine to antistatic agent is about 25 to 1 by volume.

8. The method of claim 1 wherein the volatile amine has a flash point, and wherein the spray is discontinued when the flue gas temperature is lower than the flash point of the volatile amine.

9. The method of claim 1 wherein the spray is discontinued when the flue gas temperature reaches about 291° F.

10. A method for treating flue gas of a coke-fired cupola after a flow of blast air to the cupola is terminated, the method comprising injecting into the flue gas a spray comprising at least one volatile amine and an antistatic agent.

11. The method of claim 10 wherein the flue-gas comprises sulfur-containing matter.

12. The method of claim 11 wherein the sulfur-containing matter is negatively charged.

13. The method of claim 10 wherein the spray is finely divided and wherein the antistatic agent causes the finely divided spray to be positively charged.

14. The method of claim 10 wherein condensate is formed as the flue gas is cooled by the spray.

15. The method of claim 14 wherein any acidity in the condensate is neutralized by the amine.

16. The method of claim 14 wherein the condensate has a pH that is adjusted by the amine to a level greater than about 7.0.

17. The method of claim 14 wherein the flue gas comprises dust having a pH that is adjusted by the amine to a level ranging from about 7.0 to about 7.5.

18. The method of claim 10 wherein the amine is a blended amine.

19. The method of claim 18 wherein the blended amine comprises amines selected from the group consisting of morpholine, cyclohexylamine, diethylaminoethanol, and mixtures thereof.

20. The method of claim 10 wherein the amine comprises morpholine.

21. The method of claim 10 wherein the ratio of amine to antistatic agent is about 25 to 1, by volume.

22. The method of claim 10 wherein the antistatic agent is quaternary ammonium chloride.

23. A method for adjusting corrosivity in flue gas and flue gas condensate of a coke-fired heating device during a cool-down phase of the device, the method comprising injecting finely divided droplets into the flue gas, the droplets further comprising a mixture of volatile amine and an antistatic agent that adjusts the pH of the flue gas to a non-corrosive level.

24. The method of claim 23 wherein the volatile amine comprises morpholine.

25. The method of claim 23 wherein the volatile amine comprises amines selected from the group consisting of morpholine, cyclohexylamine, diethylaminoethanol, and mixtures thereof.

26. The method of claim 23 wherein the antistatic agent comprises quaternary ammonium chloride.

27. The method of claim 23 wherein the ratio of volatile amine to antistatic agent is about 25 to 1 by volume.

28. An additive useful for treating flue gas of a coke-fired industrial device during cool-down, the additive comprising a blended amine and an antistatic agent in an amount that is sufficient to neutralize the pH of a condensate obtained by spraying into the flue gas a finely divided mist containing the additive.

29. The additive of claim 28 wherein the blended amine comprises amines selected from the group consisting of morpholine, cyclohexylamine, diethylaminoethanol, and mixtures thereof.

30. An additive useful for treating flue gas of a coke-fired industrial device during cool-down, the additive comprising morpholine and an antistatic agent in an amount that is sufficient to neutralize the pH of a condensate obtained by spraying into the flue gas a finely divided mist containing the additive.

31. The additive of claim 30 wherein the ratio of morpholine to antistatic agent is about 25 to 1 by volume.

* * * * *